(12) United States Patent
McMillan

(10) Patent No.: US 7,837,446 B2
(45) Date of Patent: Nov. 23, 2010

(54) COMPOSITE BLADE

(75) Inventor: Alison J. McMillan, Uttoxeter (GB)

(73) Assignee: Rolls-Royce PLC, London (GB)

( * ) Notice: Subject to any disclaimer, the term of this patent is extended or adjusted under 35 U.S.C. 154(b) by 395 days.

(21) Appl. No.: 11/284,854

(22) Filed: Nov. 23, 2005

(65) Prior Publication Data

US 2006/0216154 A1    Sep. 28, 2006

(30) Foreign Application Priority Data

Dec. 22, 2004  (GB) ................................ 0428201.8

(51) Int. Cl.
*F01D 5/14* (2006.01)
(52) U.S. Cl. .................. 416/224; 416/97 A; 416/229 A
(58) Field of Classification Search .................. 416/230, 416/97 A, 224, 229 A, 241 B; 415/173.4, 415/174.4
See application file for complete search history.

(56) References Cited

U.S. PATENT DOCUMENTS

| | | | |
|---|---|---|---|
| 2,344,876 A * | 3/1944 | Jamison | 416/209 |
| 4,040,770 A * | 8/1977 | Carlson | 416/230 |
| 4,480,956 A * | 11/1984 | Kruger et al. | 416/97 A |
| 4,685,864 A | 8/1987 | Angus et al. | |
| 5,112,194 A * | 5/1992 | More | 416/230 |
| 5,308,228 A * | 5/1994 | Benoit et al. | 416/230 |
| 6,206,642 B1 * | 3/2001 | Matheny et al. | 416/230 |

FOREIGN PATENT DOCUMENTS

| | | |
|---|---|---|
| GB | 871 066 | 6/1961 |
| GB | 1 260 484 | 1/1972 |
| GB | 1 291 718 | 10/1972 |
| GB | 1 311 806 | 3/1973 |

* cited by examiner

*Primary Examiner*—Edward Look
*Assistant Examiner*—Sean J Younger
(74) *Attorney, Agent, or Firm*—Oliff & Berridge, PLC

(57) ABSTRACT

A composite blade (28) comprises a root portion (38) and an aerofoil portion (40). The aerofoil portion (40) has a tip (50) remote from the root portion (38). The aerofoil portion (40) has a leading edge (42), a trailing edge (44), a suction surface (46) extending from the leading edge (42) to the trailing edge (44) and a pressure surface (48) extending from the leading edge (42) to the trailing edge (44). The composite blade (28) comprises reinforcing fibers (62) arranged in a matrix material (63). The tip (50) of the aerofoil portion (40) is arranged to define a recess (66), an insert (68) is arranged in the recess (66) and the insert (68) comprises an abradable material.

21 Claims, 2 Drawing Sheets

COMPOSITE BLADE

The present invention relates to composite blades and in particular to composite compressor blades, or composite fan blades, for gas turbine engines.

The present invention is concerned with providing a minimum clearance, or seal, between the tips of compressor blades, or fan blades, and a surrounding casing. Generally it is known to provide an abrasive material on the tips of the compressor blades, or fan blades, and to provide an abradable material on the inner surface of the casing. In use the compressor blades, or fan blades, cut, or wear, a path through the abradable material on the casing. The wear pattern on the abradable material represents the minimum clearance for that particular set of compressor blades, or fan blades. The abradable material is generally held in panels, which are secured to casing.

All the blades are slightly different in terms of tolerance, so that in any given set of blades, there is one blade, which is the longest. The longest blade is the one that has a minimum clearance with the casing and the remaining blades have larger clearances with the casing. Given that there is a variation in clearance due to the difference in tolerances of the blades, then there is a resulting reduction in performance of the compressor, or fan, of the gas turbine engine.

It would be better if the same minimum clearance were achieved between the casing and each of the blade tips.

It is known to manufacture compressor blades, or fan blades, from composite material, e.g. a fibre reinforced organic matrix material.

U.S. Pat. No. 5,112,194 discloses a composite fan blade, which has hard boron filaments extending radially from the tips of the fan blades so as to cut an abradable material on the inner surface of a fan casing, or bypass duct.

However, U.S. Pat. No. 5,112,194 will suffer from the same problem of blades with different tolerances and hence varying clearances between the tips of the fan blades and the casing.

Accordingly the present invention seeks to provide a novel composite blade, which overcomes the above-mentioned problem.

Accordingly the present invention provides a composite blade comprising a root portion and an aerofoil portion, the aerofoil portion having a tip remote from the root portion, the aerofoil portion having a leading edge, a trailing edge, a suction surface extending from the leading edge to the trailing edge and a pressure surface extending from the leading edge to the trailing edge, the composite blade comprising reinforcing fibres arranged in a matrix material, the tip of the aerofoil portion being arranged to be abradable.

The tip of the aerofoil portion may have no reinforcing fibres arranged in the matrix material.

Alternatively the tip of the aerofoil portion may have a reduced number of reinforcing fibres in the matrix material.

Preferably the tip of the aerofoil portion being arranged to define at least one recess, an insert being arranged in the at least one recess and the insert comprising an abradable material.

The composite blade may comprise a plurality of layers of reinforcing fibres, the reinforcing fibres in each layer being arranged in two dimensions.

Preferably the layers of reinforcing fibres are arranged to extend from the leading edge to the trailing edge of the composite blade.

Preferably the layers of reinforcing fibres adjacent the suction surface and the pressure surface are longer than the remaining layers of reinforcing fibres to define the at least one recess.

Preferably the at least one recess has a geometry to retain the insert.

Alternatively the insert has at least one aperture extending therethrough and at least one stitch extends through the at least one aperture and the layers of reinforcing fibres to retain the insert.

Preferably the composite blade comprises a three dimensional weave of reinforcing fibres.

Preferably the three-dimensional weave of reinforcing fibres is bifurcated to define the at least one recess.

Preferably the at least one recess has a geometry to retain the insert.

Alternatively the insert has at least one aperture extending therethrough and at least one stitch extends through the at least one aperture and through the three-dimensional weave of reinforcing fibres to retain the insert.

Preferably the composite material comprises an organic matrix.

Preferably the organic matrix material comprises an epoxy resin.

Preferably the reinforcing fibres comprise carbon fibres, glass fibres or other suitable fibres.

Preferably the composite blade is a fan blade or a compressor blade.

Preferably the suction surface is convex and the pressure surface is concave.

The present invention will be more fully described by way of example with reference to the accompanying drawings in which:—

Figure 1:
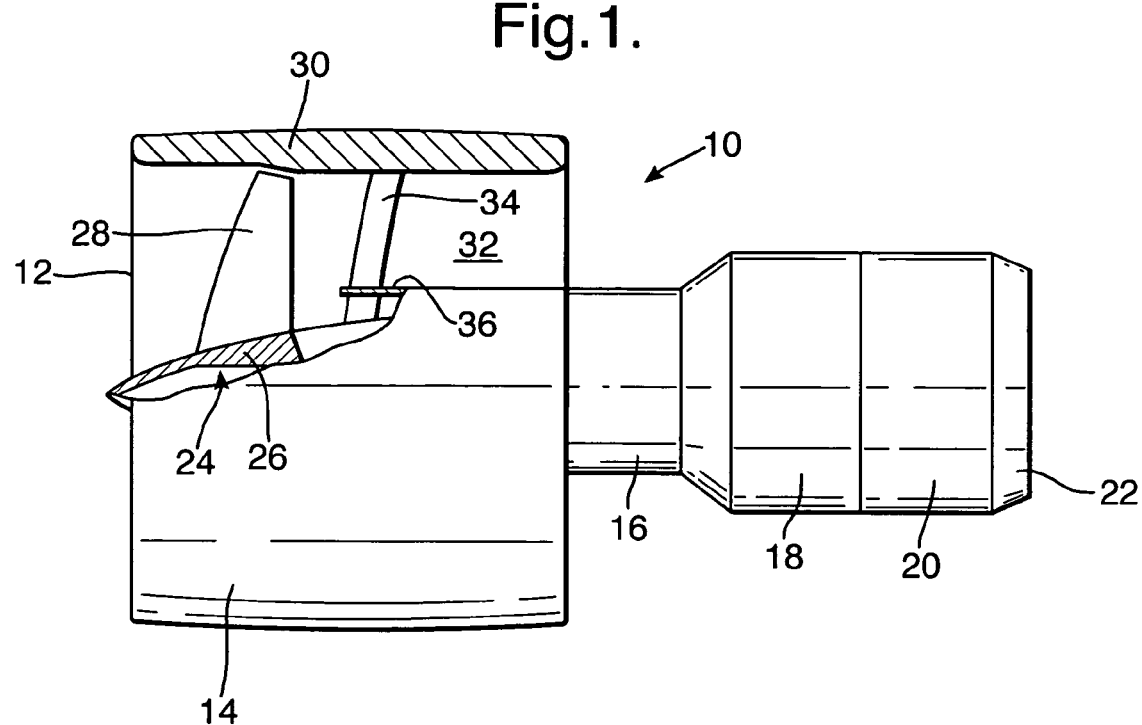
FIG. 1 shows a partially cut away view of a turbofan gas turbine engine having a composite blade according to the present invention.

A turbofan gas turbine engine 10, as shown in FIG. 1, comprises in flow series an inlet 12, a fan section 14, a compressor section 16, a combustion section 18, a turbine section 20 and an exhaust 22. The fan section 14 comprises a fan assembly 24, which comprises a fan rotor 26 and a plurality of circumferentially spaced radially outwardly extending fan blades 28 secured to the fan rotor 26. The fan section 14 also comprises a fan casing 30, which surrounds the fan assembly 24 and partially defines a fan duct 32. The fan casing 30 is secured to a compressor casing 36 by a plurality of circumferentially spaced radially extending fan outlet guide vanes 36.

The gas turbine engine 10 is quite conventional and its construction and operation will not be discussed further.

Figure 2:
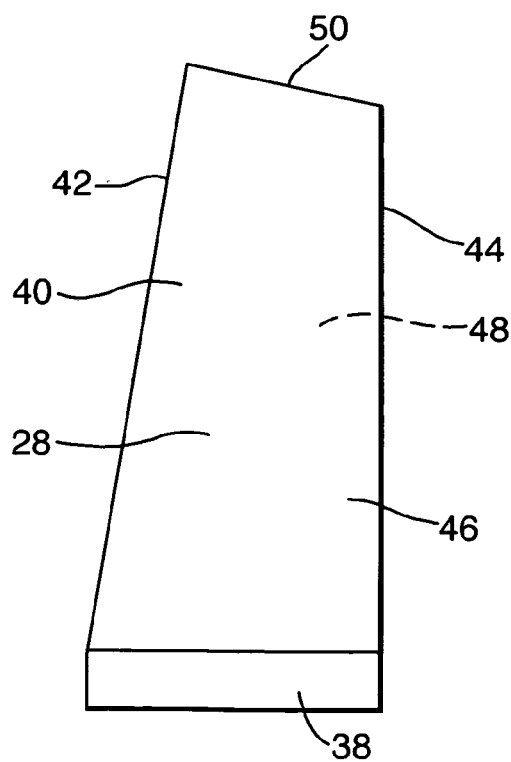
FIG. 2 is an enlarged view of a composite fan blade according to the present invention.

A fan blade 28, as shown in more detail in FIG. 2, comprises a root portion 38 and an aerofoil portion 40. The root portion 38 is of dovetail cross-section, or firtree cross-section, to match a corresponding groove in the rim of the fan rotor 26. The aerofoil portion 40 has a leading edge 42 and a trailing edge 44 and a convex suction surface 46, which extends from the leading edge 42 to the trailing edge 44 and a concave pressure surface 48, which extends from the leading edge 42 to the trailing edge 44. The aerofoil portion 40 also has a tip 50 remote from the root portion 38 and radially adjacent to the fan casing 30 to define a small radial clearance with the fan casing 30. The fan blade 28 is manufactured from a composite material, which comprises reinforcing fibres in a matrix material, for example carbon fibres, or glass fibres, in an epoxy resin or other suitable fibres in a suitable organic matrix.

Figure 3:
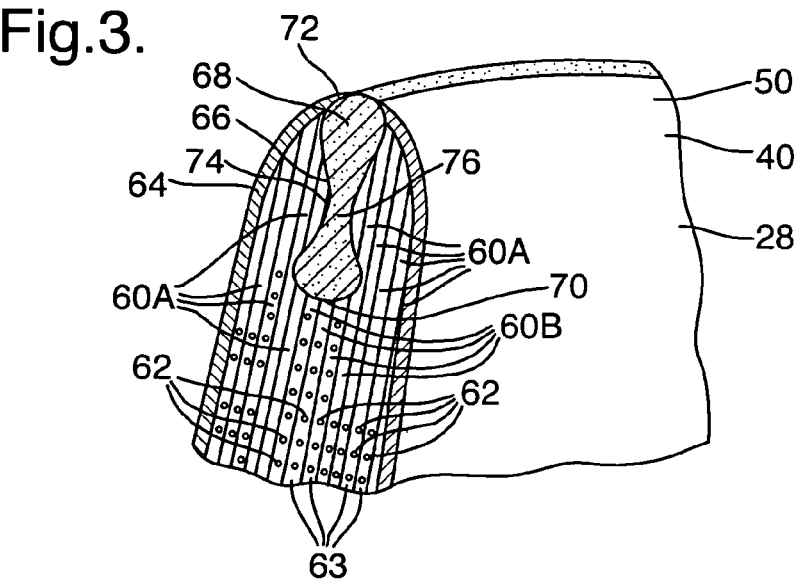
FIG. 3 is a further enlarged cross-sectional view of a composite fan blade according to the present invention.

A laminated composite fan blade 28, as shown in FIG. 3, comprises a number of layers 60A, 60B of reinforcing fibres 62. The reinforcing fibres 62 in each layer 60A, 60B are generally arranged to extend in two dimensions, for example a second set of reinforcing fibres is arranged to extend perpendicularly to a first set of reinforcing fibres. An outer wrap 64 comprises fibres woven in a two dimensional arrangement to form a fabric is provided on the layers 60A, 60B of reinforcing fibres 62. The outer wrap 64 generally comprises a fibres arranged at +45° and −45° to the longitudinal direction of the fan blade 28, i.e. to the direction from root portion 38 to tip 50 of the fan blade 28. The outer wrap 64 provides torsional stiffness, i.e. it controls the torsional vibration modes, of the fan blade 28. Alternatively the outer wrap 64 may comprise fibres arranged in a braid again with the fibres arranged at +45° and −45° to the longitudinal direction of the fan blade 28. The braided outer wrap slips over the fan blade 28. A matrix material 63 infiltrates the spaces between the reinforcing fibres 62.

At the tip 50 of the aerofoil portion 40 of the fan blade 28 the layers 60A, 60B of reinforcing fibres 62 are arranged to define a recess 66 and an insert 68 is arranged in the recess 66. The recess 66 is closed at its end 70 remote from the tip 50, its radially inner end in use, and is open at its end 72 adjacent the tip 50, its radially outer end in use. The recess 66 extends generally chordally from the leading edge 42 to the trailing edge 44 of the aerofoil portion 40 of the fan blade 28. The insert 68 comprises an abradable material, for example filler, moulded epoxy foam, other foam or plastic with suitable crushability to conform to the shape of the recess 66. The layers 60A, 60B of reinforcing fibres 62 are also arranged to extend chordally from the leading edge 42 to the trailing edge 44 of the composite blade 28. The layers 60A of reinforcing fibres 62 adjacent the convex suction surface 46 and the concave pressure surface 48 of the aerofoil portion 40 of the fan blade 28 are longer in the longitudinal direction from the root portion 38 towards the tip 50 of the fan blade 28, radially of the fan blade 28 in use, than the remaining layers 60B of reinforcing fibres 62 in the centre of the aerofoil portion 40 of the fan blade 28 to define the recess 66.

The layers 60A and 60B are arranged to define a shaped recess 66, which has a reduced cross-sectional area portion 74 at a region spaced longitudinally, or radially in use, from the ends 70 and 72 of the recess 66. The insert 68 is also shaped to match the recess 66 and has a reduced cross-sectional area portion 76 to match the reduced cross-sectional area portion 74 of the recess 66. The insert 68 extends out, radially in use, of the end 72 of the recess 66 adjacent the tip 50. The shaped recess 66 and shaped insert 68 hold the insert 68 within the aerofoil portion 40 of the fan blade 28.

The fan blade 28, as shown in FIG. 3, is produced by pre-impregnating the layers of reinforcing fibres 60A and 60B with organic matrix material, then stacking the pre-impregnated layers of reinforcing fibres 60A and 60B, inserting the insert 68 into the stack of pre-impregnated layers of reinforcing fibres 60A and 60B at the appropriate position and then heating and consolidating in a mould. Alternatively the fan blade 28, as shown in FIG. 3 is produced by stacking dry layers of reinforcing fibres 60A and 60B and inserting the insert 68 into a mould and then injecting the organic matrix material into the mould and heating and consolidating in the mould, e.g. resin transfer moulding (RTM).

In use the inserts 68 in the tips 50 the aerofoil portions 40 of the fan blades 28 are worn by a harder and more abrasive lining on the inner surface of the fan casing 30. In this case all the fan blades 28 are worn individually, but the same clearance would be achieved between the tip 50 of the aerofoil portion 40 of each fan blade 28 and the fan casing 30. The abrasive lining on the inner surface of the fan casing 30 may comprise a metal, for example steel or titanium. The inner surface of the casing itself may be hard enough to act as an abrasive lining for example if the fan casing comprises steel or titanium in which case there may be no requirement for a special abrasive lining, but a special abrasive lining well known to those skilled in the art may be used.

Figure 4:
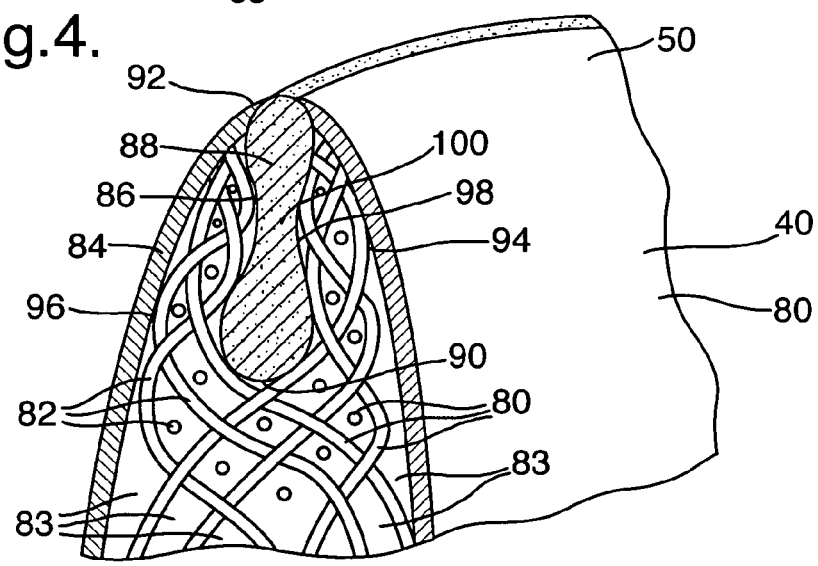
FIG. 4 is a further enlarged cross-sectional view of an alternative composite fan blade according to the present invention.

A woven composite fan blade 28, as shown in FIG. 4, comprises a number of reinforcing fibres 82. The reinforcing fibres 82 are arranged in a three-dimensional woven pattern and a matrix material 83 infiltrates the spaces between the reinforcing fibres 82. An outer wrap 84 may be provided on the three-dimensional woven pattern of reinforcing fibres 82, similarly to that described with reference to FIG. 3.

At the tip 50 of the aerofoil portion 40 of the fan blade 28 the woven reinforcing fibres 82 are arranged to define a recess 86 and an insert 88 is arranged in the recess 86. The recess 86 is closed at its end 90 remote from the tip 50, its radially inner end in use, and is open at its end 92 adjacent the tip 50, its radially outer end in use. The recess 86 extends generally chordally from the leading edge 42 to the trailing edge 44 of the aerofoil portion 40 of the fan blade 28. The insert 88 comprises an abradable material, for example filler, epoxy foam, other foam or plastic as mentioned with respect to FIG. 3. The reinforcing fibres 82 are generally woven into a single thickness in the main body of the fan blade 28 but at the tip 50 of the aerofoil portion 40 the arrangement of woven reinforcing fibres 82 is bifurcated, e.g. split two form two portions, a first portion 94 adjacent the convex suction surface 46 and a second portion 96 adjacent the concave pressure surface 48 of the aerofoil portion 40 of the fan blade 28 to define the recess 86.

The woven reinforcing fibres 82 in the first and second portions 94 and 96 are arranged to define a shaped recess 86, which has a reduced cross-sectional area portion 98 at a region spaced longitudinally, or radially in use, from the ends 90 and 92 of the recess 86. The insert 88 is also shaped to match the recess 86 and has a reduced cross-sectional area portion 100 to match the reduced cross-sectional area portion 98 of the recess 86. The insert 88 extends out, radially in use, of the end 92 of the recess 86 adjacent the tip 50. The shaped recess 86 and shaped insert 88 hold the insert 88 within the aerofoil portion 40 of the fan blade 28.

The fan blade 28 as shown in FIG. 4 is produced by weaving the reinforcing fibres 82 in the three dimensional pattern and inserting the insert 88 into the woven reinforcing fibres 82 at the appropriate position and then injecting the resin into the mould and heating and consolidating in the mould, e.g. resin transfer moulding (RTM).

In use the inserts 88 in the tips 50 the aerofoil portions 40 of the fan blades 28 are worn by a harder and more abrasive lining on the inner surface of the fan casing 30. In this case all the fan blades 28 are worn individually, but the same clearance would be achieved between the tip 50 of the aerofoil portion 40 of each fan blade 28 and the fan casing 30. The abrasive lining on the inner surface of the fan casing 30 is as described with reference to FIG. 3.

Figure 5:
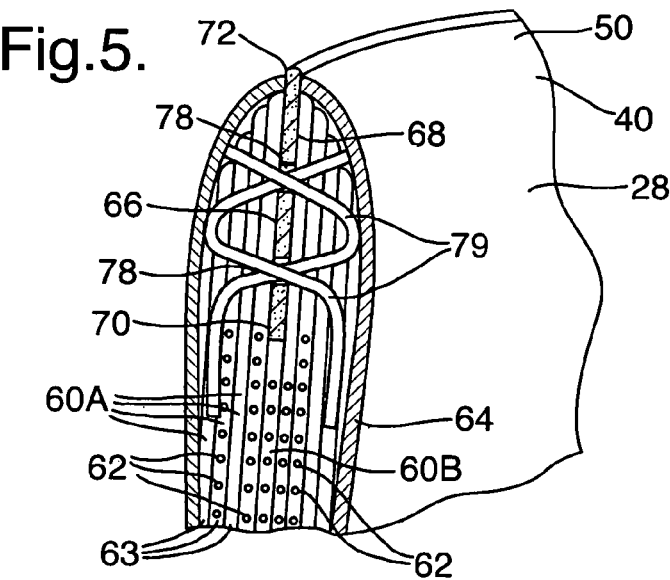
FIG. 5 is a further enlarged cross-sectional view of a further composite fan blade according to the present invention.

A further laminated composite fan blade 28, is shown in FIG. 5, and the arrangement is similar to that shown in FIG. 3 and like parts are denoted by like numerals.

The layers 60A and 60B are arranged to define a substantially straight-sided recess 66. The insert 68 is also straight-sided to match the recess 66. The insert 68 extends out, radially in use, of the end 72 of the recess 66 adjacent the tip 50. The insert 68 is provided with one or more apertures 78 spaced longitudinally and/or chordally of the aerofoil portion 40 of the fan blade 28. One or more stitches 79, or other fasteners for example staples, pins etc, are passed through the apertures 78 in the insert 68 to interlock with the layers of reinforcing fibres 60A on each side of the recess 66 to hold the insert 68 within the aerofoil portion 40 of the fan blade 28.

The fan blade 28 is produced in a similar manner to that described with reference to FIG. 3 and operates in a similar manner to that described with reference to FIG. 3.

A further possibility, not shown, is to provide apertures in an insert for a woven three dimensional arrangement of reinforcing fibres and to pass stitches, or other fasteners as mentioned above, through the apertures to interlock with the reinforcing fibres on each side of the insert and is produced in a similar manner to that described with reference to FIG. 4.

Although the present invention has been described with reference to a fan blade, the present invention is equally applicable to a compressor blade or a turbine blade, although other higher temperature materials will be required for a turbine blade.

Although the present invention has been described with a single recess and single insert in the tip of the fan blade, it may be possible to provide a number of chordally spaced recesses in the tip of the fan blade with an equal number of inserts.

Although the present invention has been described with a recess and an insert in the tip of the fan blade, it may be possible for the tip of the fan blade to comprise no reinforcing fibres, or a reduced no of reinforcing fibres, so that the tip of the fan blade itself is abradable compared to the remainder of the fan blade.

The advantage of the present invention is that clearance between the tip of each fan blade, or compressor blade, and the casing is the same minimum clearance to minimise efficiency losses of the fan blade, or compressor blade, an hence improve the efficiency of the gas turbine engine.

A further advantage of the present invention is that it is failsafe. If a piece of the abradable insert becomes detached, then the fan rotor and fan blades may continue to operate, but with an increased clearance and with reduced efficiency. This is not as serious as the loss of an abradable material and associated panel from the fan casing.

I claim:

1. A composite blade comprising:
   a root portion; and
   an aerofoil portion, the aerofoil portion having a tip remote from the root portion, the aerofoil portion having a leading edge, a trailing edge, a suction surface extending from the leading edge to the trailing edge and a pressure surface extending from the leading edge to the trailing edge, the composite blade comprising reinforcing fibers arranged in a matrix material, the tip of the aerofoil portion comprising a bi-lobed recess extending into the aerofoil portion and an insert being received and held by the recess, the insert being abradable.

2. A composite blade as claimed in claim 1, wherein the tip of the aerofoil portion has none of the reinforcing fibers arranged in the matrix material.

3. A composite blade as claimed in claim 1, wherein the composite blade comprises a plurality of layers of the reinforcing fibers, the reinforcing fibers in each layer being arranged in two dimensions.

4. A composite blade as claimed in claim 3, wherein the layers of the reinforcing fibers, are arranged to extend from the leading edge to the trailing edge of the composite blade.

5. A composite blade as claimed in claim 4, wherein the tip of the aerofoil portion is arranged to define at least one recess, an insert being arranged in the at least one recess and the insert comprising an abradable material, wherein the layers of the reinforcing fibers adjacent the suction surface and the pressure surface are longer than the remaining layers of the reinforcing fibers to define the at least one recess.

6. A composite blade as claimed in claim 5, wherein the at least one recess has a geometry to retain the insert.

7. A composite blade as claimed in claim 5, wherein the insert has at least one aperture extending therethrough and at least one stitch extends through the at least one aperture and the layers of the reinforcing fibers to retain the insert.

8. A composite blade as claimed in claim 1, wherein the composite blade comprises a three-dimensional weave of the reinforcing fibers.

9. A composite blade as claimed in claim 8, wherein the tip of the aerofoil portion is arranged to define at least one recess, an insert being arranged in the at least one recess and the insert comprising an abradable material, wherein the three dimensional weave of the reinforcing fibers is bifurcated to define the at least one recess.

10. A composite blade as claimed in claim 9, wherein the at least one recess has a geometry to retain the insert.

11. A composite blade as claimed in claim 8, wherein the insert has at least one aperture extending therethrough and at least one stitch extends through the at least one aperture and through the three dimensional weave of the reinforcing fibers to retain the insert.

12. A composite blade as claimed in claim 1, wherein the composite material comprises an organic matrix.

13. A composite blade as claimed in claim 12, wherein the organic matrix material comprises an epoxy resin.

14. A composite blade as claimed in claim 1, wherein the reinforcing fibers comprise carbon fibers, glass fibers, or other suitable fibers.

15. A composite blade as claimed in claim 1, wherein the composite blade comprises a compressor blade or a fan blade.

16. A gas turbine engine comprising a composite blade as claimed in claim 1.

17. A gas turbine engine as claimed in claim 16, wherein a casing surrounds the composite blades, an inner surface of the casing having an abrasive material.

18. A composite blade comprising:
    a root portion; and
    an aerofoil portion, the aerofoil portion having a tip remote from the root portion, the aerofoil portion having a leading edge, a trailing edge, a suction surface extending from the leading edge to the trailing edge and a pressure surface extending from the leading edge to the trailing edge,
    the composite blade comprising reinforcing fibers,
    the tip of the aerofoil portion comprising a recess extending into the aerofoil portion less than halfway of a distance from the tip to the root portion, and an insert received and held by the recess, the insert being arranged to be abradable; and
    the recess is substantially bi-lobed in shape.

19. The composite blade according to claim 18, wherein the insert is substantially bi-lobed in shape after being inserted into the recess so that the recess receives and holds the insert.

20. The composite blade according to claim 18, wherein the insert has at least one aperture, and
the tip further comprises a fastener that passes through the at least one aperture and that interlocks with the reinforcing fibers so that the recess receives and holds the insert.

21. A composite blade as claimed in claim 1 wherein the tip of the aerofoil portion has a reduced number of reinforcing fibres in the matrix material.

* * * * *